US006281898B1

(12) United States Patent
Nikolovska et al.

(10) Patent No.: US 6,281,898 B1
(45) Date of Patent: *Aug. 28, 2001

(54) SPATIAL BROWSING APPROACH TO MULTIMEDIA INFORMATION RETRIEVAL

(75) Inventors: Lira Nikolovska, Eindhoven (NL); Jacquelyn Annette Martino, Irvington, NY (US)

(73) Assignee: Philips Electronics North America Corporation

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 21 days.

(21) Appl. No.: 08/858,603

(22) Filed: May 16, 1997

(51) Int. Cl.[7] .................................................. G06F 3/14
(52) U.S. Cl. ........................................ 345/355; 345/327
(58) Field of Search .................................... 345/355, 356, 345/357, 327, 339, 352, 353, 146, 328, 349, 976, 419, 427; 348/7, 12, 13, 569, 906

(56) References Cited

U.S. PATENT DOCUMENTS

| 5,515,488 | * | 5/1996 | Hoppe et al. | 345/440 |
|---|---|---|---|---|
| 5,528,735 | * | 6/1996 | Strasnick et al. | 345/427 |
| 5,555,354 | * | 9/1996 | Strasnick et al. | 345/427 |
| 5,585,838 | * | 12/1996 | Lawler et al. | 348/13 |
| 5,623,613 | * | 4/1997 | Rowe et al. | 345/353 |
| 5,636,350 | * | 6/1997 | Eick et al. | 345/440 |
| 5,671,381 | * | 9/1997 | Strasnick et al. | 345/355 |
| 5,745,109 | * | 4/1998 | Nakano et al. | 345/340 |
| 5,767,854 | * | 6/1998 | Anwar | 345/355 |
| 5,835,094 | * | 11/1998 | Ermel et al. | 345/355 |
| 5,838,326 | * | 11/1998 | Card et al. | 345/355 |
| 5,847,709 | * | 12/1998 | Card et al. | 345/355 |
| 5,850,206 | * | 12/1998 | Kashiwagi | 345/357 X |
| 5,861,885 | * | 1/1999 | Strasnick et al. | 345/355 |
| 5,886,698 | * | 3/1999 | Sciammarella et al. | 345/349 |
| 5,982,369 | * | 11/1999 | Sciammarella et al. | 345/349 |

FOREIGN PATENT DOCUMENTS 0 564 278 * 10/1993 (EP) .

OTHER PUBLICATIONS

Video Tape: "Muriel Cooper's Work, MIT Information Landscapes", Jul. 20, 1994.*
Video Tape: "Common Ground CHI 96 Video Program", 1996.*
Martin H. Rapley et al, "Three Dimensional Interface for an Object Oriented Database", pp. 141–167.
Abstract: Visualization 1.1. History of Photography. R. Kullberg, 1996, p. 1.
Abstract: Visualization 1.4. Lifelines: Visualizing Personal Histories. B.Milash, C. Plaisant, A. Rose, 1996, pp. 1–2.

(List continued on next page.)

Primary Examiner—Crescelle N. dela Torre

(57) ABSTRACT

A three dimensional user interface allows browsing of a database displayed as a three dimensional information space. The data is organized along three axes. A current plane or layer of data is summarized on an information landscape, with different planes being selectable using a tower that is located at the intersection of the three axes. A control wall with incorporated tools is used to formulate database queries. A preview wall previews selected data. The preview wall also provides transition between previewing the searches in the 3D space and actual viewing of the programming in full screen 2D display. Application to TV programming data is shown.

18 Claims, 4 Drawing Sheets

(3 of 4 Drawing Sheet(s) Filed in Color)

OTHER PUBLICATIONS

Abstract: New Directions 3.3. Lifestreams: An Alternative to the Desktop Metaphor. S. Fertig, E. Freeman, D. Gelernter, 1996, p. 2.

Abstract: Web 4.2. The WebBook and the Web Forager: Video Use. Scenarios for a World–Wide Web Information Workspace. S. Card, G. Robertson, W. York, 1996, p. 3.

Abstract Web 4.3 The DeskScape Web Browser. M. Brown, R. Shillner, 1996, pp. 3–4.

Appendix A.5. R.P. Darken and J.L. Silbert. Wayfinding Strategies and Behaviors in Large Virtual Worlds. Naval Research Lab and George Washingtion University. In CHI 96 Video Program by C. Plaisant and M. Chignell, Eds. 1996, No Abstract Found, p. 4.

"The Perspective Wall: Detail and Context Smoothly Integrated", J. Mackinlay, G. Robertson, S. Card, pp 173–179, 1991, ACM.

"Cone Trees: Animated 3D Visualizations of Hierarchical Information". G. Robertson, J. Mackinlay, S. Card, pp. 189–194, 1991, ACM.

"Dyanmic Queries for Information Exploration: An Implementation and Evaluation". C. Ahlberg, C. Williamson, B. Schneiderman. pp. 619–626 May 3–7, 1992, CHI.

"A Spatial Browsing Approach to Multimedia Information Retrieval," L. Nikolovska, J. Marting, Appendix 1. Bibliography, pp. 12, 13, 17, 19, 1996.

"Computer Graphics and Visualization in the Global Information Infrastructure". N. Gershon, J. Brown. pp. 60–75 Mar. 1996 IEEE.

"Visualization's New Tack", N. Gershon, S. Eick, pp. 38–56, Nov. 1995, IEEE Spectrum.

"Nobody Watches TV Better Than We Do", 1992, TV Data, pp. 1–28.

* cited by examiner

SPATIAL BROWSING APPROACH TO MULTIMEDIA INFORMATION RETRIEVAL

I. BACKGROUND OF THE INVENTION

A. Field of the Invention

The invention relates to the field of information visualization, specifically graphical user interfaces for database information retrieval.

B. Related Art

Muriel Cooper at the MIT Media Lab has done work relating to "Information Spaces". These are database interfaces in which information is organized into three dimensional structures. The user is able to travel through these structures via the computer screen. The user can see through the structures because of their transparency and can focus in on detailed information using infinite zoom. These interfaces are intriguing, but bewildering.

There remains further need to give better organization to information spaces.

II. SUMMARY OF THE INVENTION

The object of the invention is to create a better organization of an information space and queries.

The object is achieved in that a display is created with three fixed axes for organizing the information, which three fixed axes are always in view.

The object is further achieved in that query tools, information, and preview of detail are organized into a single view of the space.

Currently TV information is generally obtained from guides, such as are published in newspapers or "TV guide", or from information channels. The current information sources are taxed with the currently available 50 channels. It already takes 90 seconds to preview a few hours' programming on a preview channel, and that previewing is purely passive, not allowing any individual selection of material. TV Guide already has a baffling amount of information. With the expected 500+ channels of the television of the future, television programming information will become an enormous multimedia database which requires sophisticated database retrieval tools and a user interface, which are nevertheless easy to use. A TV Guide or preview channel, with 10 times the current amount of information, simply will not be workable.

Accordingly, it is a further object of the invention to adapt user interface of the invention to television.

III. BRIEF DESCRIPTION OF THE DRAWING

The file of this patent contains at least one drawing executed in color. Copies of this patent with color drawings with be provided by the U.S. Patent and Trademark Office upon request and payment of the necessary fee.

The invention will now be described by way of non-limitative example with reference to the following drawings.

IV. DETAILED DESCRIPTION OF THE PREFERRED EMBODIMENTS

Figure 7:
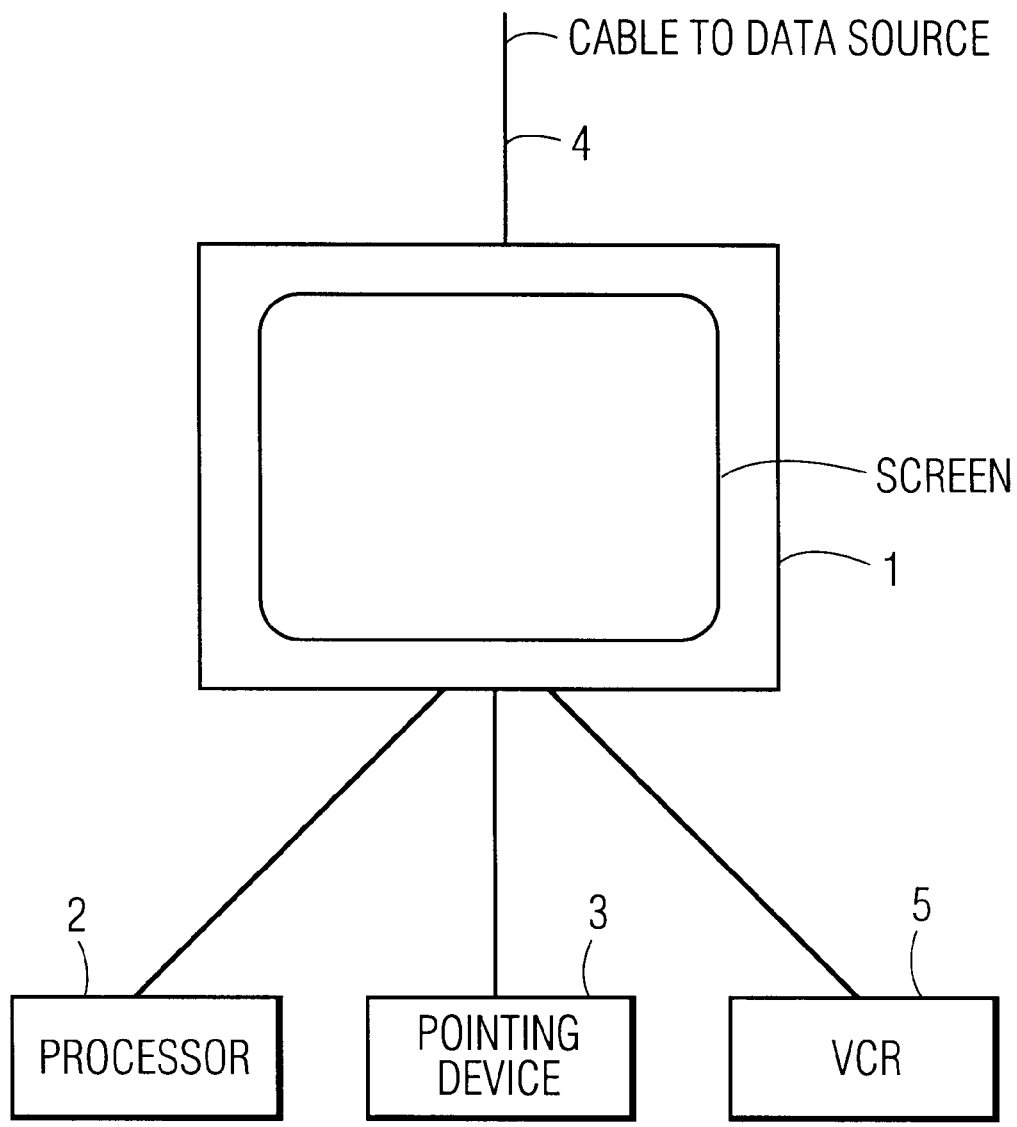
FIG. 7 shows a system which displays a user interface in accordance with the invention.

FIG. 7 shows apparatus for displaying the user interface according to the invention. The apparatus includes a screen 1, a processor 2, a pointing device 3, and a cable 4 to a data source. Optionally, the apparatus may include a VCR 5. The screen could be any type of display such as on a PC or a television. The processor could be a PC processor or a set top box, or any other type of local processor. The pointing device may be of any standard type such as a mouse, a track ball, a touch sensitive screen, or a remote. Although any type of pointing device may be used, herein the term "click" will be used to signify selection with the pointing device, as if the pointing device were always a mouse. The cable could be a television cable, a phone connection to a database, or any other suitable connection to a database. Any of the connections shown in FIG. 7 could be wireless.

Figure 1:
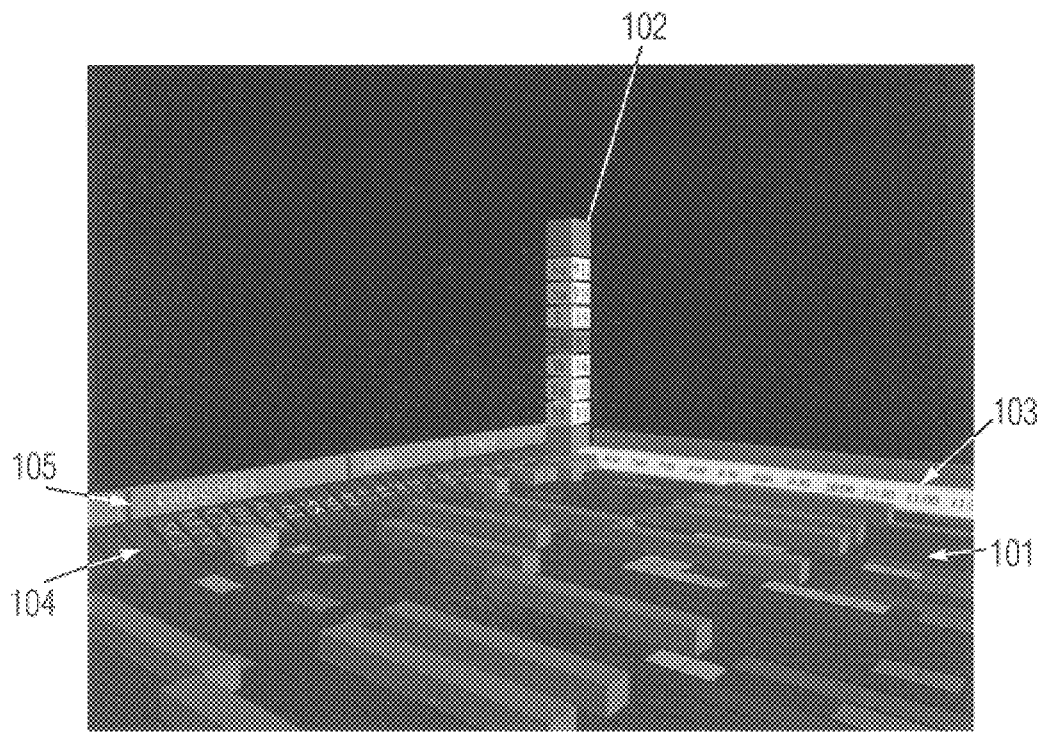
FIG. 1 shows a starting configuration of the user interface of the invention.

FIG. 1 shows a user interface in accordance with the invention as applied to television programming in a starting configuration. The interface displays an "information space" with three axes. Although the information space of the invention has walls and floor like a room, it is quite different from a room as shown in some prior art interfaces, e.g. for CDI. In those interfaces, a room with walls and a floor are displayed with icons which can be selected. The icons are really just menu options. These rooms are not tools for browsing an information space.

Although the information displayed in the preferred embodiment is relating to television programming, the interface of the invention can be adapted to querying other types of databases, e.g. professional information, home video and audio collections, family photo albums; video on demand; world wide web pages; calendar information; e-mail collections; library collections.

At the beginning, we see an information landscape or floor 101 and a tower 102.

The tower 102 defines a first axis and indicates the day and date of the information displayed in the information landscape.

The current date, 9/3/ is displayed in a contrasting color from the other dates. Though only seven dates, corresponding to one week, are displayed at any one time, the user can proceed on to different weeks by scrolling up or down the tower. In this way the interface allows more flexibility than is currently offered with programming information. Current programming information generally cannot give programming information more than a week in advance.

The information landscape has a second axis 103, which is marked in units of time of day, and a third axis 104, which is marked off with channel indicators. The information landscape then shows a table of programming indicators by channel and time of day.

FIG. 1 shows only a small number of channels, such as a user might encounter today. However, as the number of channels increases, the user can move around in the information space, by scrolling along the axes, in order to see programming information that is not displayed on the screen.

Options on the screen could be added to allow the user to change his or her point of view, by moving around in the information space. Such movement would not involve scrolling along the axes, but only changing the perspective of the information currently displayed.

As the user changes point of view, the user's "cone of vision" changes. This is the cone which protrudes out from the user's apparent position into the information space.

The information landscape is formatted using default conventions which act as transparent query tools. Different categories of programming are displayed in different colored rectangles on the landscape. Types of programming which are thought to be of most general interest are highlighted using extruded boxes. For instance, the default display mode might extrude movies and news.

The flat and extruded shapes of the information landscape are shown herein as parallelograms and parallelipipeds (boxes), respectively. Those of ordinary skill in the art might devise other shapes, such as rounded shapes, to serve the same function.

Extruding boxes can lead to blocking visualization of information. If the user is concerned about such blockage, the user can change point of view to be, for example, higher up. The user might also move to the side or even underneath, depending on how much transparency is used. Alternatively, the interface can be adjusted to have an option to make an extruded box transparent see e.g. FIG. 3 at 302, in response to a user request.

The extruded boxes might be provided with animated characters. These characters would change in shape to follow the cone of vision as the user's point of view changed in information space.

Where to display the information landscape is a matter of design choice. In FIG. 1, the landscape is on the floor. The landscape might equally well be displayed on a wall or ceiling.

Figure 2:
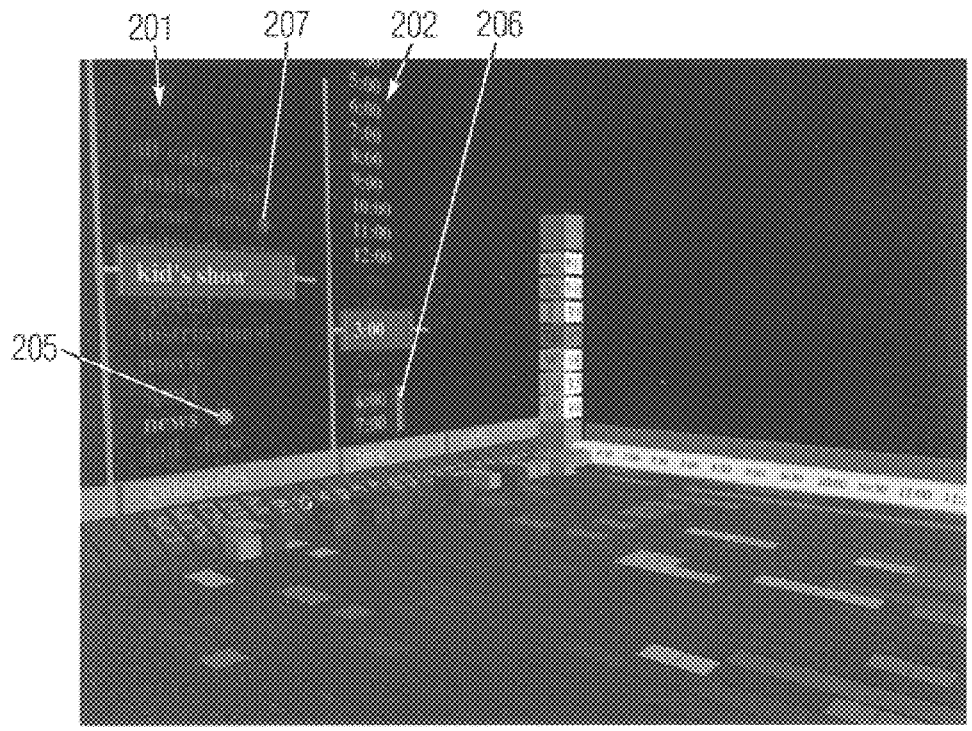
FIG. 2 shows FIG. 1 with an expanded control wall and query results.

Bar 105 forms the base of a control wall. Buttons on the bar 105 can be selected to display query options on a control wall. FIG. 2 shows what happens if the user clicks on the button marked "categories" and on the button marked "time". A column of categories 201 has appeared on the control wall, as well as a column of times 202. For purposes of simplicity, FIG. 2 shows only 10 categories of programming. Currently available electronic program guides actually list 34 categories. How to categorize programs is a matter of design choice.

Options within the columns are highlighted for selection using jointed selectors. These jointed selectors can rotate about a vertical axis or a horizontal axis to follow the user's cone of vision as the user moves about in information space. The jointed selectors travel up and down the column along with the pointer indicator produced by functioning of the pointer device.

Actual items in the columns are not selected until the user clicks on the item featured in the jointed selector.

After so clicking, the selected items can be highlighted. In FIG. 2 "news" is highlighted with a small circle 205 and 6:00 and 7:00 are highlighted with a bar 206. "Game show" is also highlighted with a circle 207. Preferably the category items on the control wall are highlighted, when selected, with the same color that those items are marked with on the information landscape, whether as flat squares or as extruded boxes. In this way a query is effectuated of the television programming database.

As a result of the query, the squares corresponding to the selected categories become extruded boxes on the information landscape. The previously extruded boxes, to the extent that they do not correspond to the current query, revert to flat squares.

Figure 3:
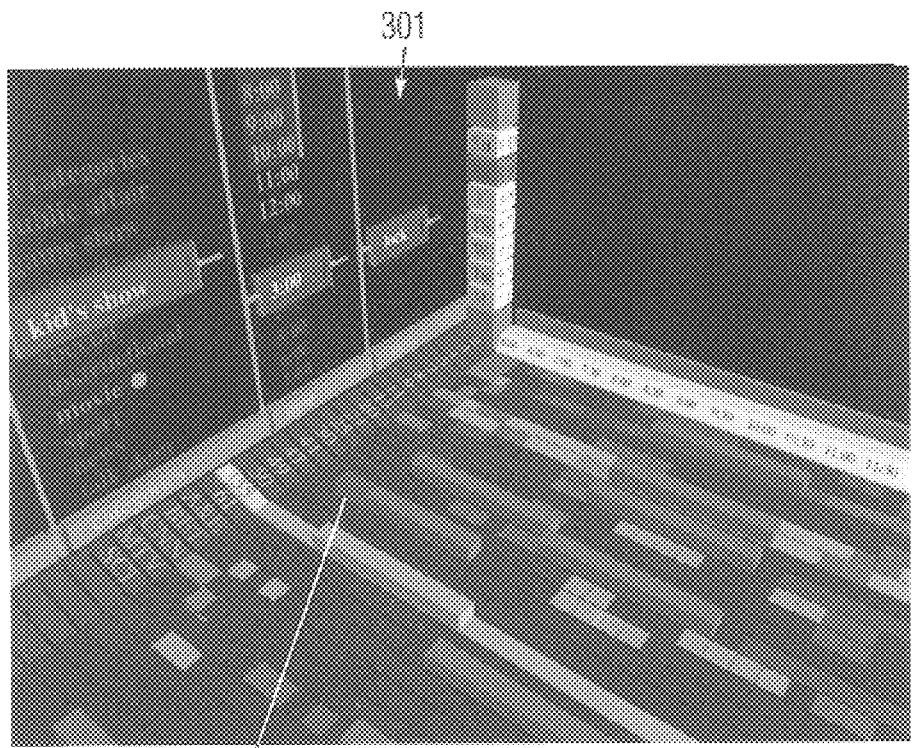
FIG. 3 shows FIG. 2 with an added tool menu and different query results.

FIG. 3 shows the result of clicking on the tools button of the bar 105. A third column 301 is displayed with a list of possible tools. One popular one might be a lock feature which would allow a parent to lock a television into a currently selected query. In this way, the parent could control what the kids could watch.

Figure 4:
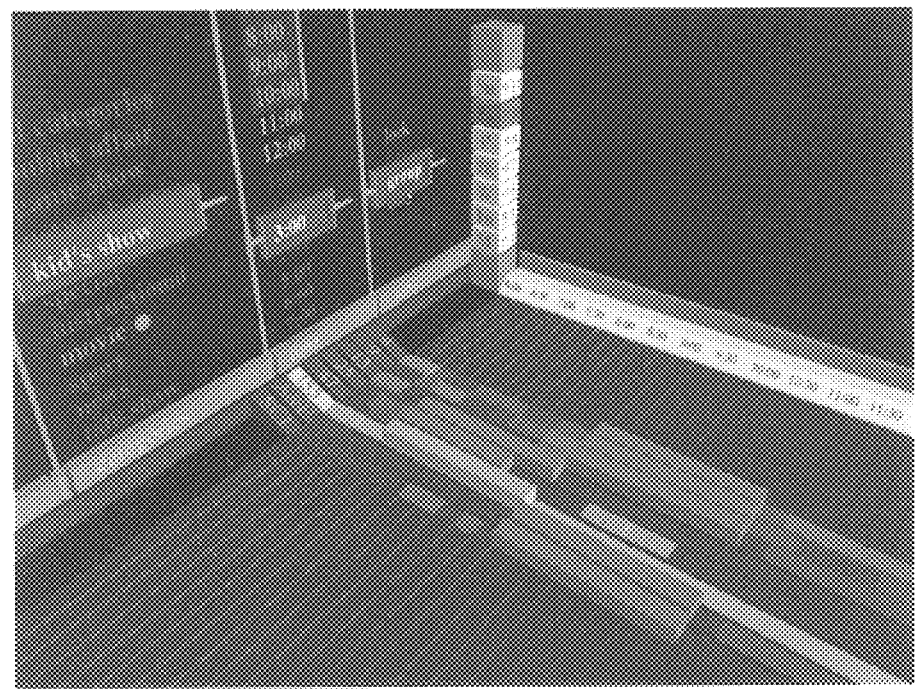
FIG. 4 illustrates the group feature of the invention.

FIG. 4 shows another tool option in the third column. This option is called "group". This option allows the user to limit the information landscape to a predefined group of channels. The "group" option dramatically simplifies the landscape according to user specifications.

Figure 5:
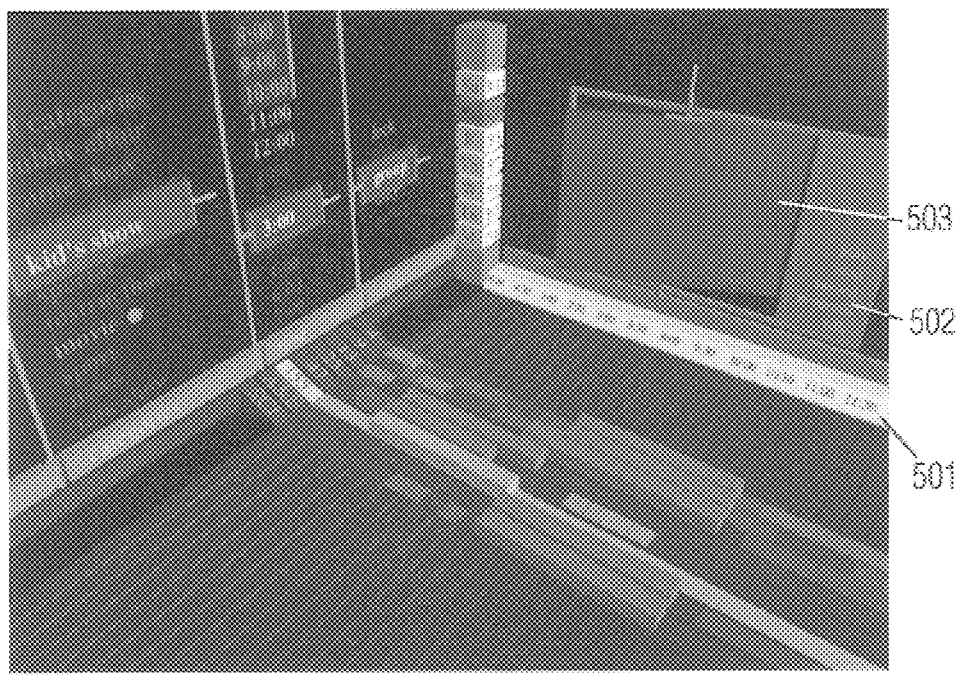
FIG. 5 shows an expanded preview wall according to the invention.

FIG. 5 shows what happens if the user clicks on the bar 501, which is the base of the preview wall. In response to such a selection, the preview wall 502 appears, with a preview screen 503. Like the selectors of FIG. 3, the preview screen is jointed to follow the cone of vision of the user, as the user's point of view changes. The preview wall 502 optionally includes VCR-like commands for control of the preview and potentially of the VCR 5, i.e. "play", "stop", "record", "program". Because the tower 102 allows the user to scroll to any arbitrary date, the programming features of the preview wall would allow the user to program the VCR to record several weeks into the future. The "edit" command can be invoked to do programming editing using the recording timer.

Figure 6:
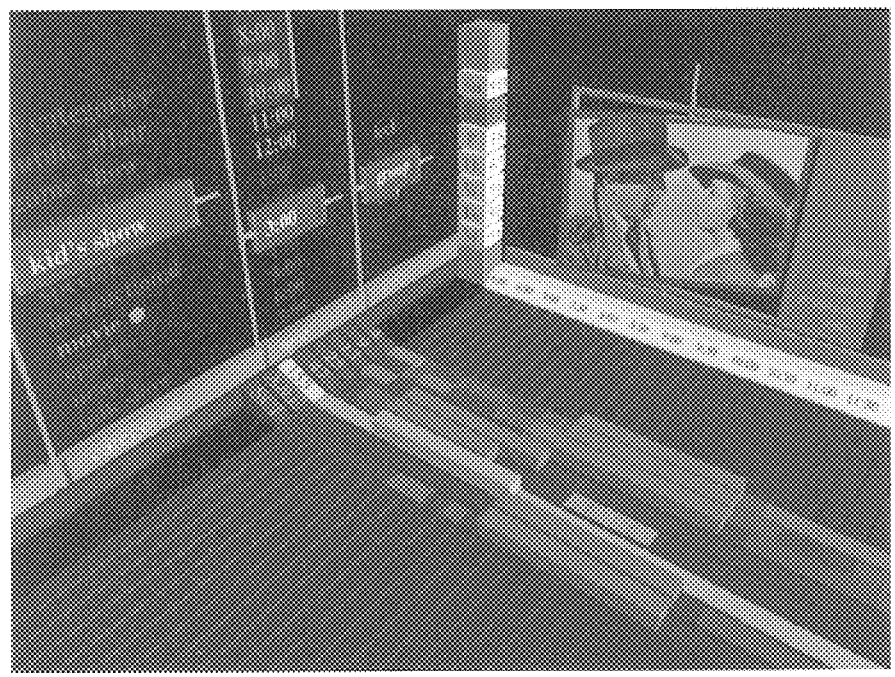
FIG. 6 shows FIG. 5 with a preview on the preview screen.

FIG. 6 shows the preview screen with an actual movie preview on it. The user can select what will appear on the preview screen by clicking on the appropriate extruded box or flat square on the information landscape. The user can select what appears on the preview screen for full viewing by clicking on the screen. In response, the interface effects a 3D to 2D zooming. If the broadcaster is not providing an appropriate preview, and if the full content is available, the full program might be displayed on the screen instead of the preview.

From reading the present disclosure, other modifications will be apparent to persons skilled in the art. Such modifications may involve other features which are already known in the design, manufacture and use of television programming guides and user interfaces for database retrieval and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

What is claimed is:

1. A graphical user interface embodied in a screen display of information of an information space, the screen display comprising first, second, and third displayed axes for visually organizing an information space, said axes providing spatial organization information that identifies characteristics of information represented within the information space, said characteristics corresponding to axis locations indicated by the spatial organization information comprising:

an apparent tower within the information space, the tower being the first axis and displaying classification information classifying database information into successive levels, each of the successive levels being selectable by selection of a vertical position on the apparent tower.

2. A graphical user interface embodied in a screen display of an information space, the screen display comprising first, second, and third axes for visually organizing an information space, the interface comprising an apparent tower within the information space, the tower being the first axis and having classification information classifying database information into successive levels, each of the successive levels being selectable by selection of a vertical position on the apparent tower, the interface being adapted for accessing television programming information, wherein the tower allows selection of a calendar date.

3. A graphical user interface embodied in a screen display of an information space, the screen display comprising first, second, and third axes for visually organizing an information space, the interface further comprising an apparent control wall, the apparent control wall having at least one column, each column corresponding to a database category, at least one data base category being selectable by selecting an entry within the at least one column, the interface being adapted for accessing television programming information, wherein the apparent control wall has at least two columns, a first column for specifying a television program type and a second column for specifying a time of day.

4. The interface of claim 3 wherein the control wall contains a selectable option for locking program selection to programs of a specified type.

5. The interface of claim 3 further comprising at least one selector for entries within a respective one of the at least one column, the selector having an apparently rotatable orientation, which orientation changes to follow a user's cone of vision as a user travels about in the information space.

6. The interface of claim 3 wherein the control wall has a base which appears to join an information landscape within the interface, so that the control wall and the information landscape together resemble a wall and a floor of a room.

7. A graphical user interface embodied in a screen display of an information space, the screen display comprising first, second, and third axes for visually organizing an information space, the interface further comprising an information landscape wherein selectable categories of information are indicated by an appearance of information items, the interface being adapted for accessing television program information, wherein the information landscape is in the form of a table having the first axis for specifying television channels and the second axis for specifying times of day.

8. A graphical user interface embodied in a screen display of an information space, the screen display comprising first, second, and third axes for visually organizing an information space, the interface further comprising an information landscape wherein selectable categories of information are indicated by an appearance of information items, the interface further comprising a wall creation selection space bordering the information landscape, which wall creation selection space allows selection for appearance of a control wall and/or a preview wall.

9. The interface of claim 8 further comprising means for specifying omission of at least one category of information from the information landscape.

10. The interface of claim 8 wherein the wall creation selection space has a base which appears to join the information landscape within the interface, so that the control wall and information landscape together resemble a wall and a floor of a room.

11. A graphical user interface embodied in a screen display of an information space, the screen display comprising first, second, and third axes for visually organizing an information space, the interface further comprising a preview wall for previewing database information prior to selecting such database information, the interface being adapted for accessing television information wherein the preview wall allows previewing of programming portions and/or viewing of complete programming.

12. A user interface for browsing an information space comprising:
    query tools;
    a generalized information depiction;
    a detailed information preview tool;
    which query tools, generalized information depiction and detailed information preview tool are all present on a user screen at one time, wherein the information space stores television programminng.

13. The interface of claim 12 wherein the query tools comprise options for selecting categories and/or times of programs.

14. The interface of claim 12 wherein the generalized information depiction comprises an information landscape in which individual programs appear as shapes.

15. The interface of claim 12 wherein the preview tool allows display of at least a portion of an actual television program.

16. A user interface for querying a database of television programming the user interface comprising:
    a first apparent plane displaying television programming information in a table organized according to channel and time of day; and
    a second apparent plane apparently oriented at an angle with respect to the first apparent plane, so that the first and second apparent planes together give an impression of perspective, the second apparent plane including query tools for selecting categories of television programming information.

17. The interface of claim 16 wherein the query tools allow specification of time and day.

18. The interface of claim 16 wherein the query tools allow specification of category of programming.

\* \* \* \* \*